United States Patent
Chmara et al.

(10) Patent No.: US 8,924,290 B2
(45) Date of Patent: Dec. 30, 2014

(54) METHOD AND APPARATUS ENABLING IMPROVED PROTECTION OF CONSUMER INFORMATION IN ELECTRONIC TRANSACTIONS

(71) Applicant: Rockstar Consortium US LP, Plano, TX (US)

(72) Inventors: Thomas P. Chmara, Richmond (CA); Raymond Bruce Wallace, Ashton (CA); Ryan Stark, Ottawa (CA)

(73) Assignee: Rockstar Consortium US LP, Plano, TX (US)

( * ) Notice: Subject to any disclaimer, the term of this patent is extended or adjusted under 35 U.S.C. 154(b) by 44 days.

(21) Appl. No.: 13/858,435

(22) Filed: Apr. 8, 2013

(65) Prior Publication Data

US 2013/0226809 A1  Aug. 29, 2013

Related U.S. Application Data

(63) Continuation of application No. 11/269,358, filed on Nov. 8, 2005, now Pat. No. 8,417,633.

(60) Provisional application No. 60/626,046, filed on Nov. 8, 2004.

(51) Int. Cl.
 *G06Q 40/00* (2012.01)
(52) U.S. Cl.
 USPC .......................................... 705/40; 705/14.1
(58) Field of Classification Search
 USPC ............. 705/39, 40, 44, 35, 34, 43, 42, 65, 4, 705/41, 76; 235/379, 380, 381; 707/E17.032
 See application file for complete search history.

(56) References Cited

U.S. PATENT DOCUMENTS

| | | | | |
|---|---|---|---|---|
| 7,083,087 | B1 * | 8/2006 | Gangi | 235/380 |
| 7,127,427 | B1 * | 10/2006 | Casper | 705/44 |
| 7,204,412 | B2 * | 4/2007 | Foss, Jr. | 235/380 |
| 7,324,976 | B2 * | 1/2008 | Gupta et al. | 705/65 |
| 7,357,312 | B2 * | 4/2008 | Gangi | 235/380 |
| 7,387,238 | B2 * | 6/2008 | Foss et al. | 235/380 |
| 7,509,281 | B1 * | 3/2009 | Brown et al. | 705/37 |
| 7,516,886 | B2 * | 4/2009 | Gangi | 235/380 |
| 7,527,195 | B2 * | 5/2009 | Keithley et al. | 235/380 |

(Continued)

OTHER PUBLICATIONS

Webcommerce Help Guide, www.webcom.com; (internet document), downloaded electronically Dec. 26, 2002.*

(Continued)

*Primary Examiner* — Kelly Campen
(74) *Attorney, Agent, or Firm* — Withrow & Terranova, PLLC

(57) ABSTRACT

According to a commercial method of the present invention, a merchant forwards transaction data to a consumer. If the consumer accepts the transaction, a payment command is forwarded to a service provider. The service provider selectively applies authentication before approving payment. Once payment is approved, the service provider forwards a payment instruction, including consumer account information, to a payment service. The payment service forwards payment to the merchant and a payment confirmation is returned to the service provider and, through the service provider, to the consumer. The service provider stores information about each transaction performed by each subscriber. Consumer identity is protected because it is only exchanged between the service provider and the payment service, and is not made available to the merchant. In addition, the storage of the transaction information by various devices facilitates the return process and adds marketing capability to the service provider.

24 Claims, 5 Drawing Sheets

(56) References Cited

U.S. PATENT DOCUMENTS

| | | | |
|---|---|---|---|
| 7,548,884 B1 * | 6/2009 | Thomas | 705/38 |
| 7,567,925 B2 * | 7/2009 | Millary et al. | 705/35 |
| 7,610,040 B2 * | 10/2009 | Cantini et al. | 455/410 |
| 7,644,036 B2 * | 1/2010 | McCoy et al. | 705/39 |
| 7,743,979 B2 * | 6/2010 | Fredman | 235/379 |
| 7,827,056 B2 * | 11/2010 | Walker et al. | 705/14.23 |
| 7,865,437 B2 * | 1/2011 | Neal et al. | 705/39 |
| 8,155,983 B2 * | 4/2012 | Coyne | 705/2 |
| 8,204,764 B2 * | 6/2012 | Coyne | 705/2 |
| 8,214,233 B2 * | 7/2012 | Coyne | 705/2 |
| 8,332,317 B1 * | 12/2012 | McCoy et al. | 705/40 |
| 8,396,758 B2 * | 3/2013 | Paradise et al. | 705/26.62 |
| 8,401,894 B2 * | 3/2013 | Wang et al. | 705/15 |
| 8,417,633 B1 | 4/2013 | Chmara et al. | |
| 2002/0016778 A1 * | 2/2002 | Konno et al. | 705/80 |
| 2002/0095360 A1 * | 7/2002 | Joao | 705/30 |
| 2002/0123938 A1 * | 9/2002 | Yu et al. | 705/26 |
| 2003/0023535 A1 * | 1/2003 | Hoffman | 705/36 |
| 2004/0030647 A1 * | 2/2004 | Hansen et al. | 705/40 |
| 2004/0128245 A1 * | 7/2004 | Neal et al. | 705/40 |
| 2004/0172291 A1 * | 9/2004 | Knowlton | 705/2 |
| 2005/0121511 A1 * | 6/2005 | Robbins et al. | 235/380 |
| 2005/0197976 A1 * | 9/2005 | Tuton et al. | 705/417 |
| 2005/0256802 A1 * | 11/2005 | Ammermann et al. | 705/44 |
| 2005/0289053 A1 * | 12/2005 | Ruttenberg | 705/40 |
| 2006/0041487 A1 * | 2/2006 | Santalo et al. | 705/30 |
| 2006/0282289 A1 * | 12/2006 | Jacobs et al. | 705/2 |
| 2007/0244740 A1 * | 10/2007 | Desenberg | 705/10 |
| 2008/0065565 A1 * | 3/2008 | Walker et al. | 705/400 |
| 2008/0228641 A1 * | 9/2008 | Fredman | 705/39 |
| 2008/0300997 A1 * | 12/2008 | Dawson et al. | 705/26 |
| 2009/0018937 A1 * | 1/2009 | Joao | 705/30 |
| 2009/0234771 A1 * | 9/2009 | Ledbetter et al. | 705/41 |
| 2009/0240610 A1 * | 9/2009 | Barsade | 705/31 |

OTHER PUBLICATIONS

TakePayment.com (as of Feb. 3, 2003) http://web.archive.org/web/20030202013748/http://takepayment.com, retrieved Sep. 29, 2009.*

Restriction Requirement for U.S. Appl. No. 11/269,358, mailed Jul. 14, 2008, 8 pages.

Non-Final Office Action for U.S. Appl. No. 11/269,358, mailed Dec. 15, 2008, 9 pages.

Final Office Action for U.S. Appl. No. 11/269,358, mailed Aug. 5, 2009, 10 pages.

Final Office Action for U.S. Appl. No. 11/269,358, mailed Jan. 22, 2010, 10 pages.

Advisory Action for U.S. Appl. No. 11/269,358, mailed Apr. 15, 2010, 2 pages.

Final Office Action for U.S. Appl. No. 11/269,358, mailed May 28, 2010, 14 pages.

Non-Final Office Action for U.S. Appl. No. 11/269,358, mailed Jun. 21, 2011, 14 pages.

Final Office Action for U.S. Appl. No. 11/269,358, mailed Dec. 22, 2011, 13 pages.

Board of Appeals Examiner's Answer to Appeal Brief for U.S. Appl. No. 11/269,358, mailed Sep. 12, 2012, 6 pages.

Notice of Allowance for U.S. Appl. No. 11/269,358, mailed Dec. 10, 2012, 7 pages.

Non-Final Office Action for U.S. Appl. No. 13/858,446, mailed Nov. 6, 2013, 18 pages.

* cited by examiner

METHOD AND APPARATUS ENABLING IMPROVED PROTECTION OF CONSUMER INFORMATION IN ELECTRONIC TRANSACTIONS

RELATED APPLICATIONS

The present U.S. Utility Application claims priority pursuant to 35 U.S.C. §120, as a continuation, to U.S. Utility patent application Ser. No. 11/269,358, filed Nov. 8, 2005, now U.S. Pat. No. 8,417,633, which issued Apr. 9, 2013 and which claims priority pursuant to 35 U.S.C. §1.119(e) to provisional patent application 60/626,046, filed Nov. 8, 2004, the disclosures of each of which are hereby incorporated herein by reference in their entireties.

FIELD OF THE INVENTION

This invention relates generally to the field of commerce and more specifically to a method and apparatus which advantageously uses service providers to facilitate commercial transactions.

BACKGROUND OF THE INVENTION

The financial-services industry continues to make large investments in programs to combat credit fraud in order to reduce transaction risks, especially in the consumer market. For example, several industry players have started to integrate "smart chip" technology into payment cards, often referred to as "smart cards". A smart chip is a microprocessor embedded in the payment card. The chip is able to store a small amount of information and to control the conditions under which the information can be accessed or modified.

The primary purpose of the chip is to authenticate the identity of the cardholder before permitting charges on the payment card. Authentication of cardholder identity is typically performed by swiping the smart card at a merchant's card reader and using a challenge-PIN pair to confirm cardholder identity. Example "Smart Chip" programs include American Express® "Blue", MasterCard's OneSMART and Visa's "EMV" cards.

Although the smart card solution inhibits use of the card by unauthorized users, it does little to maintain the privacy of cardholder information. Cardholder information, including the account numbers, expiration date and identify of the cardholder, is generally collected at a merchant's card reader during cardholder authentication. The information may subsequently be used in manners which are undesirable to the cardholder, such as to track cardholder purchases for directed advertising, or even worse, for identity theft. In these days of continually-increasing concern over identity theft, consumers are growing less comfortable with personal identification information being shared in electronic transactions.

The growth of wireless products has increased the types of payment options available to a consumer beyond smart cards. For example a "digital wallet" provides functionality for mobile payments (this specific application also being known as "proximity payments"), for either credit or debit purchases. With the digital wallet, the subscriber's cellular handset, handheld device or other token, includes a specialized chipset; when the cellular handset is passed over the merchant's reader, the consumer's charge information is collected by the merchant's reader. A code representing the subscriber's identity is transmitted from handset to merchant's receiver (typically using Bluetooth or other near field radio technology).

With digital wallets, the subscriber's identity (or token representing the subscriber's identity) that is stored in the handset is passed as needed to the merchant—and by extension to anyone with access to the merchant's back-office infrastructure—for each merchant with whom the subscriber transacts business. Similar to smart cards, digital wallet users thus run the risk of identity theft. Identity theft may also result if the handset is stolen; theft of the handset, especially if the theft remains undetected, is a theft of the subscriber's identity token, which may be used to exploit other financial vulnerabilities of the subscriber.

Another disadvantage of digital wallets is that, because the subscriber's identity is stored in the handset, a loss or theft of the handset is a loss of the subscriber's the ability to pay. The loss of a debit—based digital wallet results in the loss of the cash balance remaining in the handset.

Another problem associated with current digital wallets is that it is difficult to move a subscriber's payment capacity between devices. Devices are often limited in the variety of access technologies they are capable of supporting, so merchants or consumers may require numerous different devices to support different types of access technologies. In addition, the current implementation of digital wallets makes it difficult to integrate a flexible and changeable challenge-response mechanism, thereby placing any value associated with the digital wallet at risk.

It would be desirable to identify a method and apparatus which would increase the protection afforded to consumer information to reduce the risk of identify theft. In addition, it would be desirable to increase the protection afforded to consumer resources and the variety of payment options available to the consumer while decoupling of payment capability from a specific device, token, or card.

SUMMARY OF THE INVENTION

According to one aspect of the invention, a method of doing business with a merchant includes the steps of receiving an offer associated with a transaction from the merchant, the offer including a transaction tuple uniquely identifying the transaction, and accepting the offer, including forwarding a payment communication including the transaction identifier to a service provider. Such an arrangement removes the necessity sharing customer information with the merchant.

According to another aspect of the invention, a method of transferring funds between a consumer and a merchant includes the steps of receiving, at a service provider, a payment communication generated by the consumer in response to an offer forwarded to the consumer by the merchant, the payment communication including a transaction tuple uniquely identifying the transaction and a selection of the payment option. The method includes the step of authenticating the transaction, wherein a level of authentication is selected in response to one or more characteristics of the transaction. The method includes the step of forwarding an authorization to transfer funds to a payment service associated with the payment option selection. An increased or different authentication challenge may be may additionally be applied to the transaction, based on amount, selected payment option, or other criteria as chosen by the service provider and/or payment service.

According to another aspect of the invention, a method doing business with a consumer includes the steps of a merchant forwarding an offer to the consumer, the offer including a transaction tuple comprising a plurality of fields uniquely identifying the transaction and a plurality of acceptable payment options, and the merchant subsequently receiving a payment confirmation from a payment service with that payment confirmation including the transaction tuple. The payment confirmation can also be maintained at a trusted intermediary service provider, and may include transaction details at selectable levels of specificity.

According to a further aspect of the invention, a receipt, generated by a merchant in response to a payment confirmation received from a payment service is described. The payment confirmation indicates a payment for an item or items associated with a transaction and the receipt includes a transaction tuple identifying a service provider associated with the transaction, a merchant identifier associated with the transaction, a transaction identifier and a time stamp associated with the transaction.

According to an additional aspect of the invention, a method of handling a consumer return includes the step of identifying a transaction tuple associated with an item to be returned. The transaction tuple includes a service provider identifier and a merchant identifier. The method includes the steps of forwarding a refund request to a payment service associated with the merchant identifier, the refund request including the transaction tuple, and receiving a confirmation of refund from the payment service. The transaction details can be held by the service provider on behalf of the customer with the provider acting as a trusted third party to the transaction. The same mechanism can be employed when the purchase was for a service and the request is for adjustment of the bill.

According to another aspect of the invention, a method of returning an item to merchant includes the steps of identifying a transaction tuple associated with an item to be returned, the transaction tuple including a service provider identifier and a merchant identifier, forwarding the transaction tuple to the merchant associated with the merchant identifier and receiving a refund confirmation from the service provider.

According to a further aspect of the invention, a method of updating a transaction log associated with a consumer at a service provider to reflect returns includes the steps of receiving a refund confirmation from a payment service, the return confirmation including a transaction tuple associated with a returned item, updating an entry in the transaction log associated with the transaction tuple to reflect a refund paid for the returned item and forwarding the refund confirmation to the consumer.

Such arrangements may be implemented using wireless communication between the merchant and consumer. Sensitive consumer-account information may be securely exchanged between the consumer and a Service Provider (SP) during consumer profile setup at the SP. Providing account information prior to purchase transactions removes the need to broadcast information for each purchase, and reduces the probability of identity theft. During a purchase, the subscriber forwards the desired purchase transaction to the SP. The SP may flexibly apply different levels of authentication to consumer purchase transactions, for example in response to purchase amount, purchase type, purchase frequency or other triggers. By providing an authorized payment process that is controlled by an SP, the consumer is not tied to any particular handheld payment device, but may roam between different types of handheld payment devices that use different protocols. The consumer, by selecting one of a plurality of different payment options, also has the ability to 'roam' between multiple different payment services. In addition, by allowing payments to be controlled by a Service Provider, the consumer is not geographically limited in their ability to use the payment method of the present invention, but may use the payment method in any geographical region supported by the roaming capabilities of the Service Provider.

An additional advantage of the present invention is that the loss of any particular handheld payment device does not affect the consumer's ability to access funds associated with a consumer account. In addition, because each transaction is viewed by the SP, the SP may be used to store transaction histories, allowing a consumer to quickly provide transaction evidence when it, is desired to return a purchase, without needing to keep track of receipts which may not have been printed well, or may have been damaged, lost, or rendered illegible. These and other features of the present invention will be described in more detail below in conjunction with the attached figures.

DESCRIPTION

The present invention is directed to a payment method which re-directs the traditional flow of commerce to provide a purchasing environment with increased security over consumer identity and consumer resources, as well as increased flexibility in payment options. In a traditional commercial environment, a consumer approaches a merchant with an offer to purchase, and provides the merchant with a payment token. The payment token may be cash, a credit card a smart card, a digital wallet or other means. The merchant accepts the offer by processing the payment token to retrieve funds associated with the token. Some authentication may be required to enable the consumer to pass the token to the merchant. As discussed above, such a situation undesirably makes consumer information available to the merchant, and limits the portability of consumer resources to handheld items which may be lost, damaged, or stolen.

Figure 1:
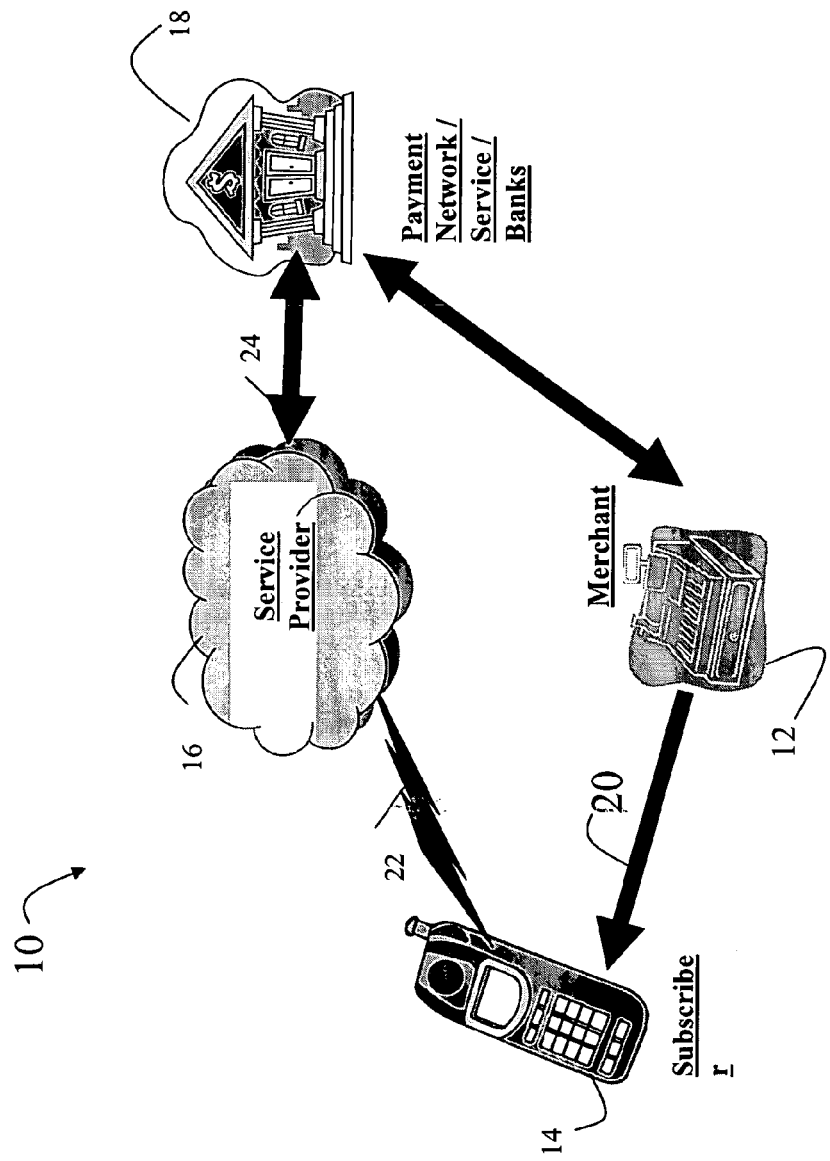
FIG. 1 is a network diagram provided to illustrate a general flow of the commercial process of the present invention.

According to one aspect of the invention, the traditional commercial flow is modified as shown in the process 10 FIG. 1. Rather than have the consumer forward the offer to the merchant, the merchant 12 forwards a transaction including an offer to purchase a good or service to the consumer 14. In FIG. 1, an exemplary consumer a subscriber to a wireless service, and the device used by the exemplary consumer to communicate with the merchant and the Service Provider is a cellular phone service provider, although the present invention is not limited to any particular subscriber device or any specific type of service provider, and devices such as Programmable Digital Assistants (Pads), laptops, or other devices may readily be substituted herein.

The consumer/subscriber 14 accepts the merchant's offer by forwarding a payment communication to a Service Provider (SP) 16. The SP may be any service provider (cellular SP, Internet SP, etc.) capable of communicating with a cons er/subscriber and executing the below functionality. Thus the Service Provider may be a cellular phone Service Provider, an Internet Service Provider, etc. The Service Provider may support roaming capabilities, so that the particular SP contacted in a particular commercial transaction is a roaming partner of the SP generally associated with the consumer. The payment communication sued by the consumer to the SP may indicate a type of payment token to use to satisfy the merchant, or alternatively the consumer may have a pre-established profile that identifies payment tokens to be used for purchases. The SP may authorize the payment communication via a challenge-PIN or other method, or if the purchase price is small, the SP may determine that the pre-established subscriber-SP authentication is sufficient to authorize acceptance of the payment communication.

Once the payment communication is authorized, the SP forwards the payment communication to a payment service 18 associated with the payment token. The payment service may be bank, credit card agency, other financial institution, a payment service of the SP itself, or other resource which includes fund dispensing capability. The payment service 18 forwards payment funds, together with information to uniquely associate those funds with the current transaction, to the merchant 12, and an indication of payment to the SP 16. The SP 16 forwards the indication of payment to the consumer 14 at the same time that the merchant receives payment. The SP may also store transaction details for later retrieval by the consumer.

The present invention has numerous advantages over the traditional commercial transactions. Unlike existing payment services (and indeed credit-card and debit-card models, which assume a "passive" (vs. interactive) consumer token like a credit card), the process of the present invention does not require the consumer to surrender their personal information (usually including name and credit-card number and expiry date) to each merchant with whom they wish to transact. In addition, moving the control of consumer authentication and fund delivery to the SP enables the consumer to gain access to their funds via any device that is capable of communicating with the SP. Because the payment method is controlled by the SP, the consumer may use the payment method in any geographical location supported by roaming capabilities of the SP. The consumer also has a flexibility to roam between different types of payments services for each transaction. A further advantage of the present invention is that the loss of an access device does not result in loss of funds, or access to funds. In addition, because each transaction is viewed by the SP, the SP can control storage of transaction histories (either locally at the SP or remotely) on a consumer basis, and make the transaction histories readily available to the consumers should the consumer decide to return an item to a merchant.

There are therefore four interfaces in the process of the present invention; a merchant to consumer interface; a consumer to SP interface, an SP to payment service interface, and a payment service to merchant interface. Each will now be described in more detail below with regard to FIG. 2, which is a functional flow diagram that will be used to describe a the process of to the present invention, with each step in the process indicated by a labeled arrow in FIG. 2.

Merchant to Consumer Interface

As mentioned above, unlike the existing systems in the present invention a commercial transaction is initiated when transaction data 15 is sent by the merchant to the consumer's device. Each transaction being processed is identified by a tuple 25 which includes a transaction identifier (ID) 20 generated by the merchant at the time of presentment to identify this transaction. A tuple is defined herein as a collection of one or more elements. It should be understood that the tuple of the present invention is flexibly sized, and may have elements dynamically added and updated during the commercial transaction by the different participants to the transaction. For example, a service provider may add a service provider identifier to enable payment confirmations to be appropriately logged. Merchants may add time stamp data to further authenticate a transaction. The tuple is thus not limited in the types of fields that it may include.

One field that should be included in the tuple is a transaction identifier. The transaction identifier should uniquely identify the transaction for a specific consumer/merchant pair. The transaction identifier may be globally unique, but if the transaction identifier cannot be globally unique (for example, if it an identifier provided by a Point Of Service device recurs after a period of time) it should be unique to the specific consumer merchant pair for accurate future access of the transaction by either party. As will be described in more detail below, future accesses of the transaction may be required for accounting purposes or to appropriately handle returns.

The tuple 25 also includes information about the merchant (at a minimum the merchant's ID 21 with their chosen payment service), and optionally a timestamp. Not all of the values of the tuple associated with each transaction are populated at the initiation of the transaction. For example, if the merchant presents several payment options to the consumer/subscriber, the merchant ID may be different for each payment option. The merchant ID of the tuple identifying the transaction is not recorded until a payment option is selected by a subscriber. Similarly, to reduce the probability of fraud, the time stamp associated with the transaction is preferably populated using the time stamp of the forwarding of the transaction to the payment service. More on the population of the tuple, and how it may be used to uniquely identify each transaction, will be described below.

Thus, in addition to the tuple fields, the transaction data 15 include a payment option field 24, which may identify a list of approved payment services for the merchant, as well as merchant identifiers for each of the payment services. The transaction data may also include one or more descriptor fields 26 that describe the value of the offer, an ASCII, text or bar code descriptor of the item or service associated with the offer, or other information. The present invention is not limited to any particular transaction data, provided some information is provided which uniquely identifies the transaction and enables delivery of identified funds to the merchant.

At step 100, the transaction data 15 is transferred from the merchant to the consumer. The transfer of transaction data to the consumer's device may be performed in any one of a variety of ways, including using Bluetooth or other short-range radio interface or manual entry on the consumer's keypad if appropriate Point-of-Sale (POS) equipment is not available. For instances where the consumer is willing to share their contact information, this transaction information can be sent as a message or communication through a wireless network. The provision of transaction details to the subscriber may or May not be encrypted, to preserve privacy of the transaction for the consumer.

Consumer to SP Interface

Once the consumer receives the transaction data 15 from the merchant, the consumer initiates acceptance of the offer manifested in the transaction by forwarding a payment communication to the Service Provider. In one embodiment, using the features of the handset, the consumer selects (implicitly or explicitly) a preferred payment method for the identified payment options of the merchant. A preferred payment method may be explicitly selected by using the handset of the device, or by touching the screen, etc. The preferred payment method may be implicitly indicated when a payment communication is sent without an explicit indication and the consumer has previously provided, to the SP, an ordered list of one or more preferred payment options.

Figure 2:
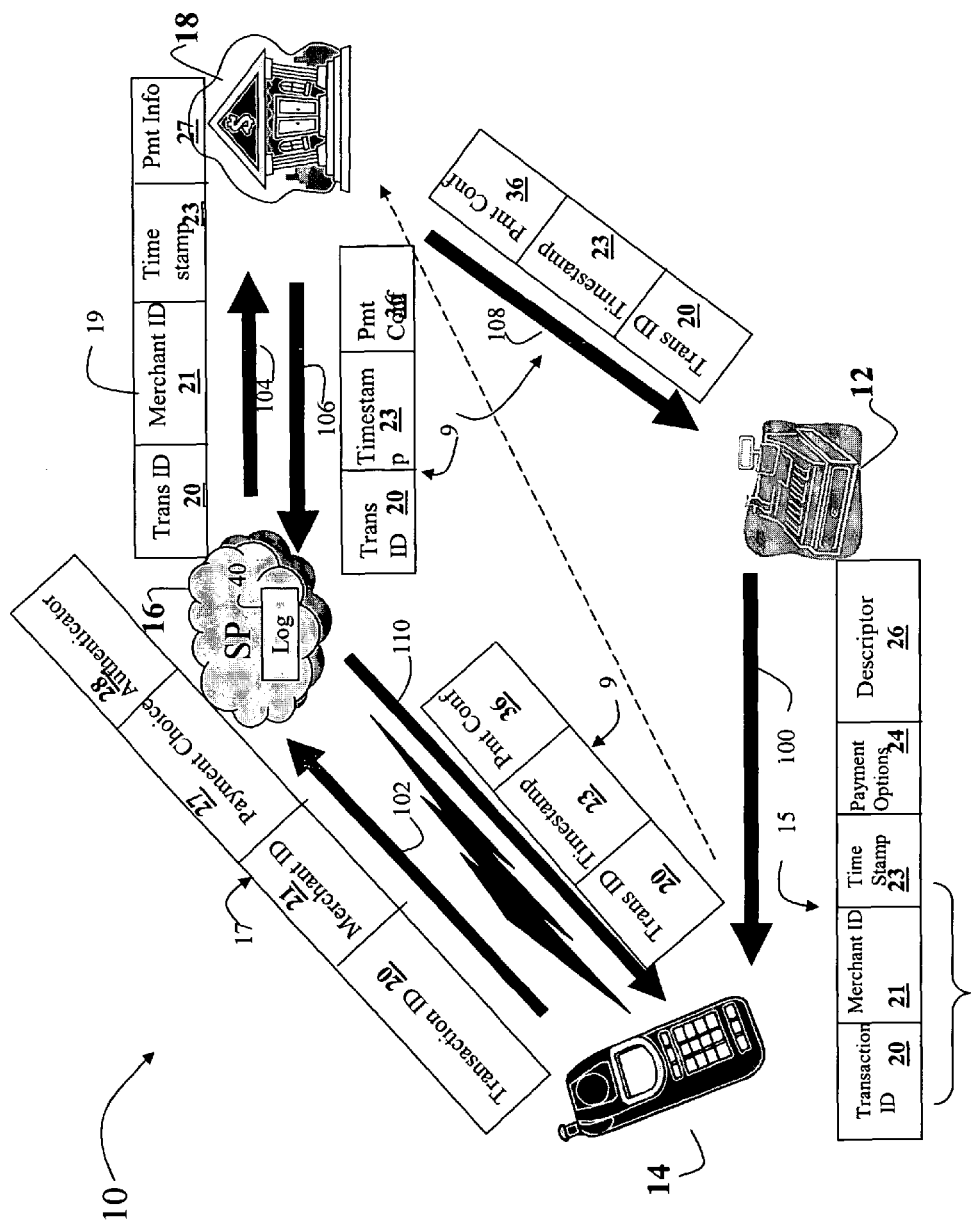
FIG. 2 is a network diagram illustrating the transfer of transaction information between devices of the network of FIG. 1 during processing of a commercial transaction according to the present invention.

In one embodiment, the selection of a payment method triggers a direct communication with the payment service (as indicated in the dashed line in FIG. 2). In some instances, such as in micro-payment transactions described with regard to FIG. 4, the payment service is a Service Provider, but in other embodiments, the payment service may simply be a non-service provider type of payment service, such as a credit card company or other financial institution. In a scenario where there is no Consumer SP communication, there is no Consumer to SP interface; while such a payment method still maintains consumer information privacy, it does not take advantage of several value added features of the consumer SP interface.

Thus in a preferred embodiment of the invention, selection of payment method triggers a payment communication 17 with the Service Provider. Alternate forms of this embodiment may include the issuance of the payment communication 17 to the SP in response to transaction selection, by selecting a dedicated ICON on a display of the handheld device, by explicit dialing of a number associated with the SP, or any one of a variety of other methods. In one preferred embodiment, the connection between the consumer and the service provider is a Java-based secured connection; it can be other forms of communication without loss of applicability (appropriate levels of handset intelligence are already present in most new models of cellular handsets). An example, without loss of generality, of an alternate form of communication would be Short Message Service (SMS) or Multimedia Message Service (MMS), both of which are available on digital GSM networks and allow text messages to be sent and received via the network operator's message center to a mobile phone, or from the Internet. Suffice it to say that any variety of methods that are used by a consumer to forward transaction data to a Service Provider may be substituted herein without affecting the scope of the present invention.

Exemplary fields that may be included in the payment communication 17 are shown in FIG. 2 to include the transaction identifier 20, the merchant identifier 21 associated with the payment choice, and selected payment option 27 (although, as described, this field may not be populated). In addition, the payment communication may already carry with it an implicit or explicit authenticator 28. It may be an implicit authenticator if the source mobile handset receiving service from a wireless provider. (It may equally effectively be another type of terminal, a WiFi telephone or online connection). As mentioned above, such an "implicit" or "default" authentication may be sufficient for low-value transactions. In at least the case of cellular telephony it has the limitation of identifying the subscriber identity but not in all cases the identity of the user of the terminal.

The SP (or payment service, as will be described in more detail below) may determine that a higher level of explicit authentication is required. The need for explicit authentication may be determined responsive to parameters of the transaction such as the price; in response to GPS information establishing that the transaction is not being placed from the store associated with the merchant; or for any other reason or policy which would indicate to the SP that there may be a risk associated with dispensing funds. Another case where this can arise is when the SP attempts to process the transaction with the payment service—the payment service may demand a higher level of authentication for this transaction prior to completing the transaction. In either case, the service provider will initiate a challenge-response exchange with the terminal, where the consumer is required to satisfy the authentication challenge before the transaction can be processed. Such an automatic incremental authentication escalation adds value to the commercial process of the present invention by increasing confidence as to the veracity of the transactions and lowering the risk to financial institutions and other payment services.

Figure 3:
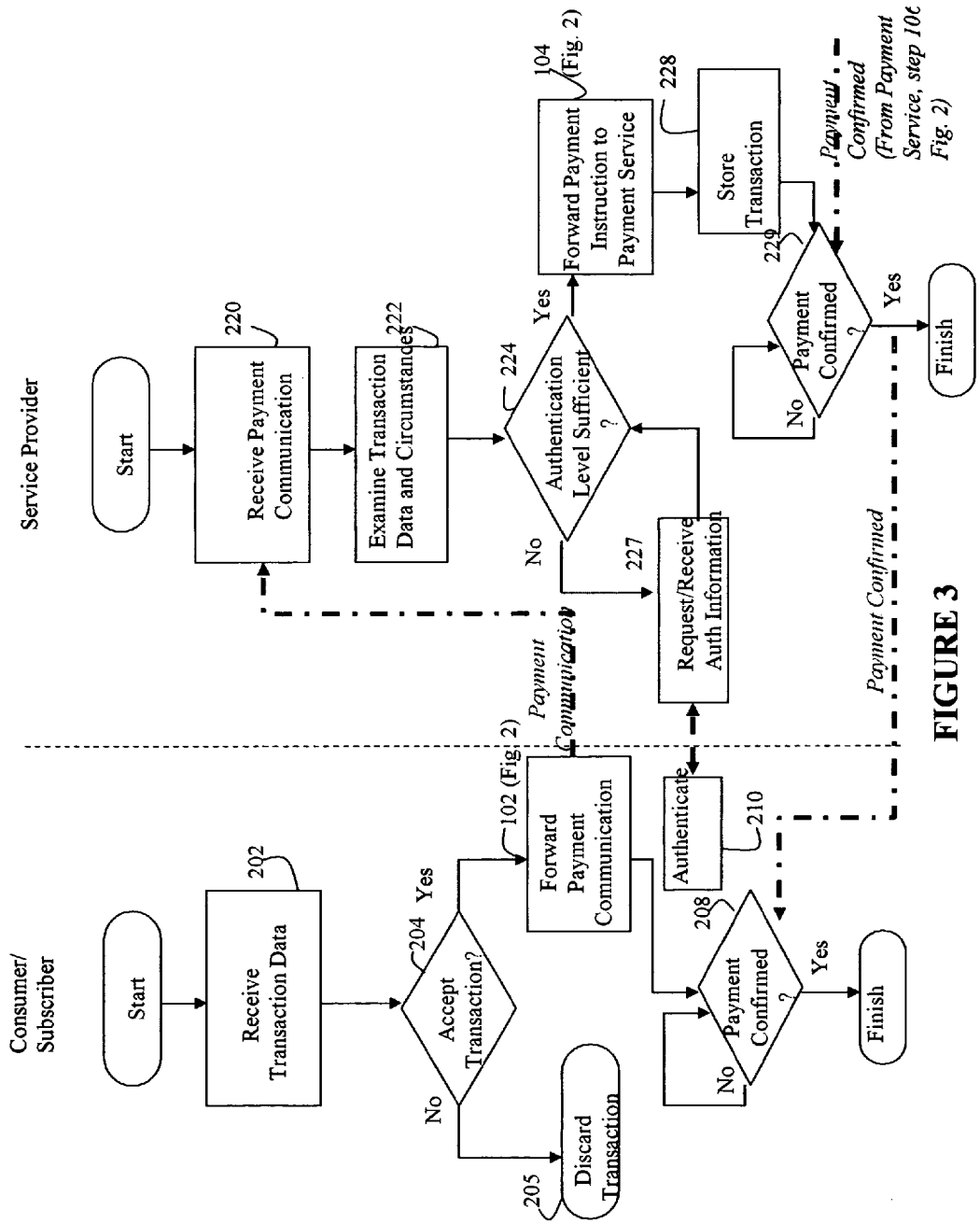
FIG. 3 is a flow diagram provided to illustrate various steps performed by the consumer/subscriber and the service provider during transaction acceptance.

Referring briefly to FIG. 3, flow diagram illustrates several exemplary steps that may be performed in the flexible, escalating authentication process 200 of the present invention. At step 202, the consumer receives the transaction data 15 from the merchant, and at step 204 determines whether to accept the transaction. If the consumer does not wish to accept the transaction, the transaction is discarded at step 205. If the consumer wishes to accept the transaction, the payment communication 17 (indicated by dashed line in FIG. 3) is forwarded to the SP at step 102 (FIG. 2). The process at the consumer proceeds to step 208, awaiting confirmation of payment.

After the SP receives the payment communication at step 220, the SP examines the transaction data and circumstances of the transaction to determine whether the default authentication is sufficient for the transaction. Circumstances of the transaction may include a frequency of transactions, distances between this transaction and recent transactions to verify the likelihood of validity of the transaction; whether GPS information indicates that the subscriber/consumer is at the associated merchant. Transaction data that may cause the SP to determine that more authentication than the default is desired is the size of the proposed payment, the frequency of transactions, etc.

If it is determined that authorization is insufficient, then at step 227 the SP further authenticates the consumer/subscriber. The nature of these additional challenge-response interactions may be a request to furnish a "secret key" of some kind known to the consumer. Without loss of generality, it tray equally well rely on characteristics or attributes of the consumer. Examples of such other forms of authentication include photographic identification (especially in those cases where the handset is equipped with camera function) and biometric authentication features. The challenge-response may involve one or more of these interactions individually or in combination.

Of substantial importance is that neither the challenge nor the response need be stored in the handset, and either or both can be changed based on level of authentication required, time of day, as a result of an update to the shared secret, or other policy-based rules. This reduces the dependency on keeping the handset secure as minimal authentication tokens need be stored in the terminal; and allows the same or similar authentication to be performed from a different terminal for convenience or in the event of loss or damage to any terminal.

This quality of authentication can be a standard level of risk available as a service to multiple payment services; or can be tailored for a specific institution, possibly at additional cost. Importantly, the infrastructure for this authentication service does not need to be duplicated across multiple payment services or ASPs—it becomes a service offered by the network provider.

Once the SP determines that a sufficient level of authentication has been received from the consumer/subscriber, then the process proceeds at the SP to step 104 (FIG. 2), where the payment instruction is forwarded to the payment service.

Once the payment instruction is forwarded to the payment service, the SP stows the transaction data at step 228, and at step 229 awaits payment confirmation from the payment service.

The service provider may therefore receive and store transaction information for their entire subscriber base. According to one aspect of the invention, certain transaction information stored by the SP may advantageously be analyzed and released to marketing companies, thereby increasing the value added to the service provider implementing the present invention.

Referring back to FIG. 2, exemplary fields that may be included in the payment instruction 19 that is forwarded to the payment service include the transaction ID 20, the merchant identifier 21, the time stamp 23 (now a populated field reflecting the time that the instruction is forwarded by the SP), and payment information, including the subscriber account information and the value of the offered item. Note that in the present invention, subscriber account information is added to the payment instruction by the service provider, and did not exist in the record sent by the subscriber's terminal.

SP to Payment Service Interface

The service provider's interface to the payment service or financial institution can itself take many forms. In one preferred embodiment, the service provider offers a standard authentication facility wherein the transaction and authentication details are offered to the payment service, with agreed transaction classes being authenticated by the service provider to heightened levels of confidence as described above. Information regarding the subscriber's account with the payment service and any passwords may be stored by the SP, and used when the SP communicates with the payment service. In such a situation, the SP essentially acts as a proxy for the subscriber/consumer.

In another preferred embodiment, the service provider can demand an additional authentication exchange with the consumer based on a request by the payment service. The service provider deals with the technical issues of properly forwarding the request for authentication information to the subscriber, and retrieving the response from the subscriber for propagation to the payment service independent of the network and technology used by the consumer. The validation can be performed by the service provider or forwarded opaquely to the payment service.

In yet another preferred embodiment, the service provider may proxy for the payment service based on a "floor price" model; or may itself implement a payment or "clearinghouse" service and forward aggregated transactional details to one or more payment services on a regular basis. Such a methodology may be preferable for frequent, low cost transactions, in order to reduce costs associated with frequent accesses of the payment service. Such a situation is similar to existing 'micro-payment' technology, with an important distinction being that the micro payments of the present invention relate to a relationship between a subscriber and the SP, and not as a result of a merchant, SP relationship.

Payment Service to SP and Merchant Interface(s)

Acceptance or rejection of the transaction, and consequentially confirmation of payment, is handled by the payment service. If the service provider is acting as the payment service, (when servicing micro-payments for example as described with regard to FIG. 4) it generates acceptance or rejection of the transaction. Otherwise, the acceptance or rejection of the transaction is returned to the service provider by the payment service, and propagated back to the purchaser's terminal to inform them of the transaction status. The status includes the tuple, which may advantageously be extended with information to identify the service provider.

The merchant is also informed of the completion status of the transaction, much as they would be for any other payment method. Connectivity methods that already exist with current payment services may be employed for the payment service to merchant interface of the present invention. The payment service propagates the transaction status to the merchant using the merchant's POS connection. However, where that POS has traditionally dialed a telephone number to process transactional details (as in credit-card validation), in the present invention the POS simply dials out to retrieve the transaction status. The transaction status can be retrieved by matching the transaction ID (that was offered at the beginning of the transaction). Alternatively, the merchant may periodically contact the payment services, accepting any and all transaction status records that are destined for this merchant and this POS within the periodic time frame. The transaction status records may also include an extended tuple, including both financial-services information, which augments the tuple 25 to include service provider information. Whether an extended tuple is used, or whatever fields comprise the tuple, the same information should be used in the tuple by the merchant, the service provider and the consumer, to enable accurate tracking of the transaction.

FIG. 2 illustrates that the payment service 18 forwards, at step 106, a payment indication 9 to the service provider 16, where the payment indication includes the transaction ID 20, the time stamp 23 and a payment confirmation. At step 108 the SP forwards the payment confirmation to the merchant 12. At step 110, the SP forwards the payment indication 9 to the consumer 14. Thus both purchaser and merchant receive independent transaction confirmation from trusted entities and do not have to trust to the accuracy or honesty of the others' devices. Such an arrangement is a significant improvement over the traditional method, wherein a consumer is privy solely to the approval information provided by the merchant.

Figure 4:
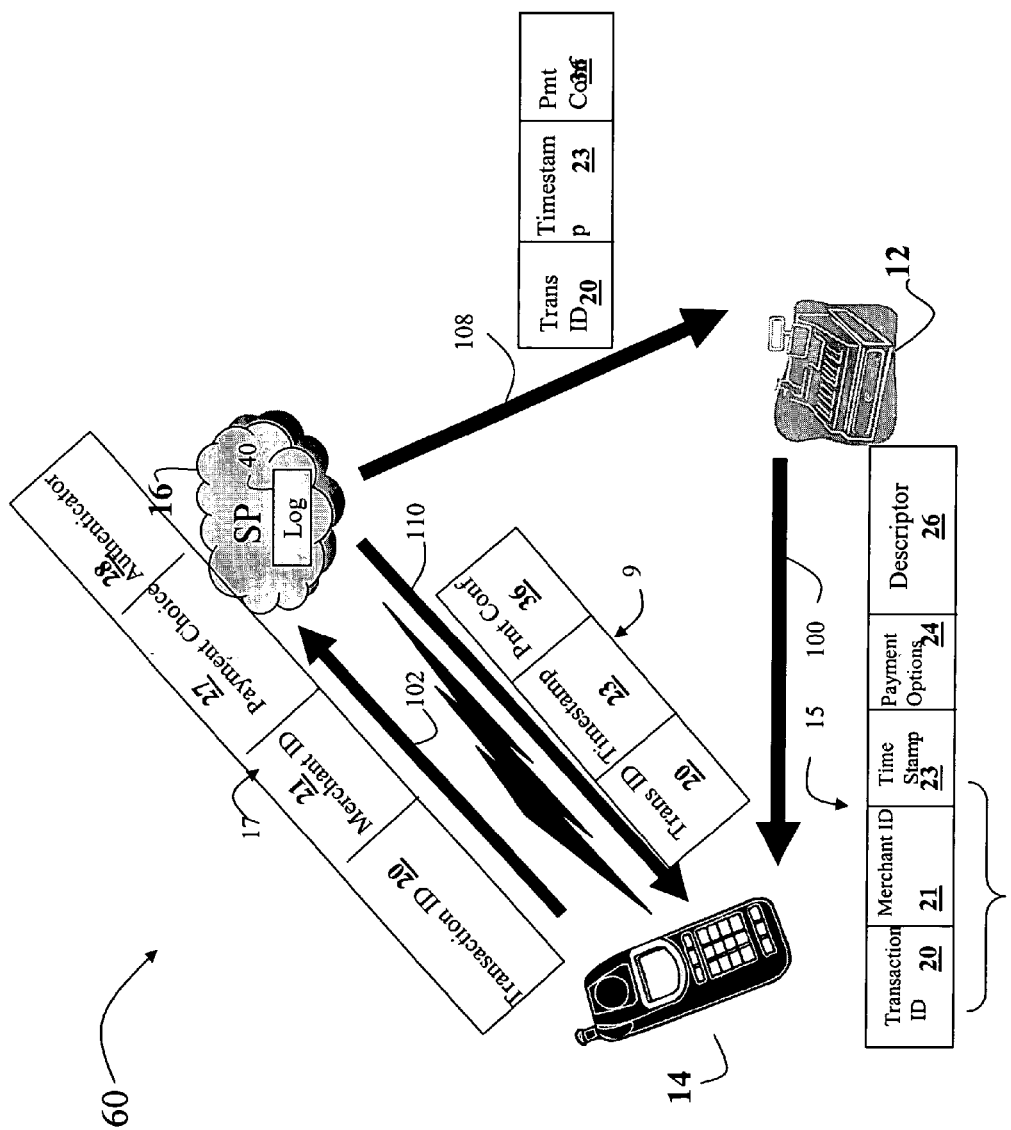
FIG. 4 is a network diagram illustrating an alternate implementation of the commercial process of the present invention.

Referring briefly to FIG. 4, an alternative implementation of the commercial process of the present invention is shown. In this implementation, the service provider serves as the payment service, authorizing transactions and forwarding funds to the merchant. The service provider may update the payment service records asynchronously of the actual purchase. Such an arrangement allows purchases to be grouped, minimizing the costs of accessing the payment service and allowing the payment service to be accessed at non-peak hours. Although such an arrangement is particularly advantageous for small purchases, or micro-payments, the present invention is not limited to the use of such an implementation for any particular type of purchase.

Processing Returns

Returning goods is frustrating using the current commercial model; in order to ensure that the merchant is actually the source of the returned goods, merchants frequently require the receipt to be provided with the returned item. However, receipts are easily lost or misplaced by a consumer. The merchant may require that the consumer use the same payment token used for the initial purchase, so even if the consumer has the appropriate receipt, if the consumer should lack the appropriate token, the return may not be completed. In addition, the merchant has no guarantee that the receipt has not previously been used to return another item.

Figure 5:
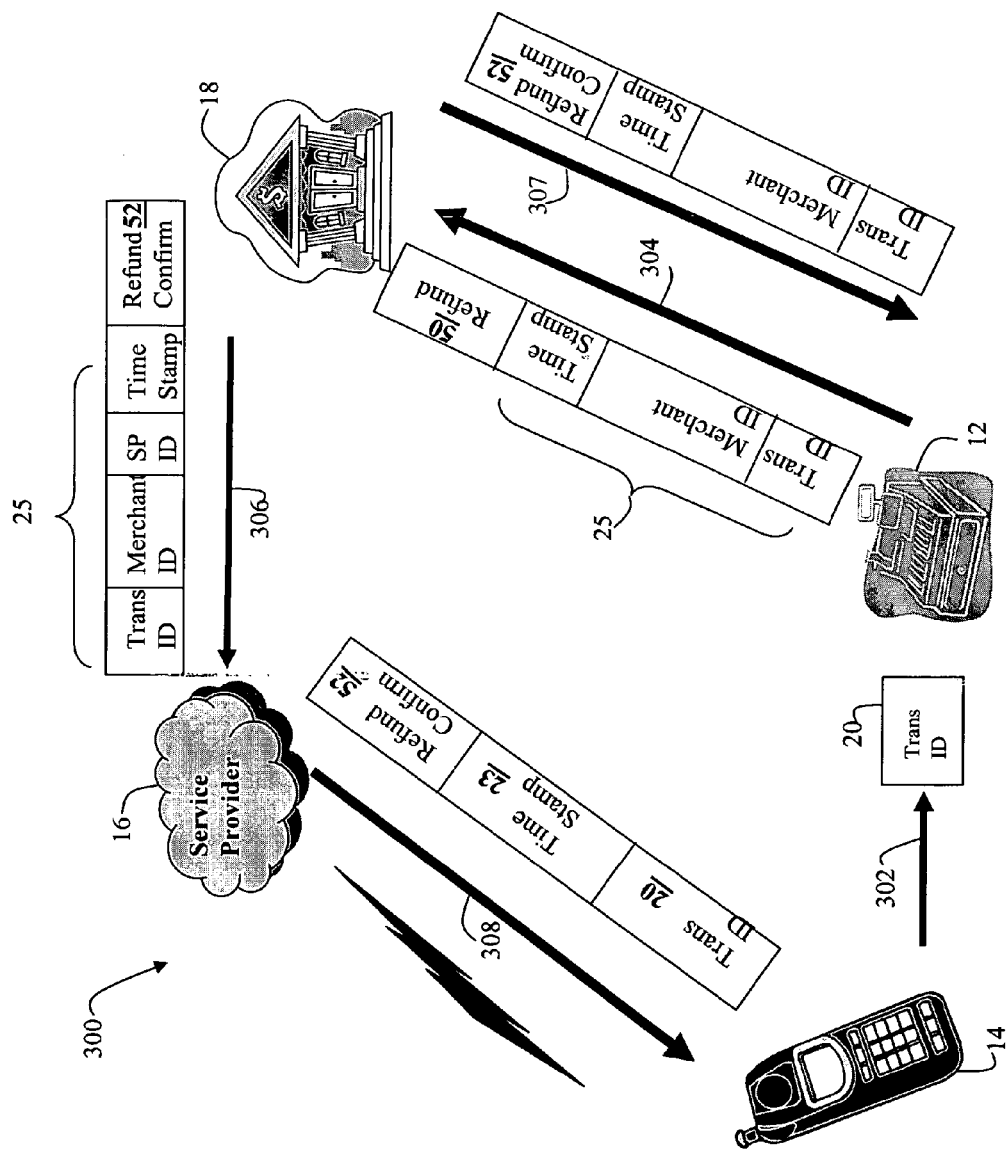
FIG. 5 is a network diagram illustrating a return process supported by the present invention.

The present invention overcomes the problems of the traditional commercial process through the use of the unique transaction tuple that is available to all parties to the transaction. The transaction tuple may be used in a variety of ways to increase the ease of the return process while increasing merchant confidence in the validity of the transaction. A return process 300 of the present invention is illustrated in the functional flow diagram of FIG. 5. At time of purchase, the tuple associated with the transaction may be printed as part of a receipt that is provided to the consumer; and in a preferred embodiment will also be stored by the service provider. Storing the transaction details with the service provider ensures that there is a trusted party that has possession of transaction details; thus a merchant may retrieve details from the SP and not rely on receipts provided by the consumer; likewise, a consumer may retrieve the transaction details from the SP, and thus need not rely on any information provided by the merchant (as to price, etc.). The tuple may be provided in bar code or other form. Alternatively, the process may be paperless, with the transaction information being stored either within the handset, at the SP, or some combination of both, recognizing that a copy stored in the handset is primarily a convenience for the consumer and the trusted copy is with the service provider.

When the consumer returns the item, at step 302 the transaction tuple associated with the item is provided to the merchant in any one of a variety of forms. For example, if a receipt has been provided, the consumer may return the receipt to the merchant. Alternatively, should a receipt not be available (either due to loss by the consumer or simply because one is not needed and therefore is not provided by the merchant), the consumer may retrieve the tuple from local storage or the service provider, and forward it to the merchant in much the same manner as transaction information is originally received from the merchant; i.e., using Bluetooth transmission, manual key entry or other method. Thus storing the transaction tuple at multiple locations alleviates the "lost receipt" problem in traditional commercial transactions.

Upon receipt of the transaction information from the consumer, a quick scan of the receipt identifies the transaction and the payment service that is to be credited. The transaction is then forwarded at step 304 to the financial-services provider for refund (much as a credit-card transaction can be credited back to the cardholder using today's technologies). Because the consumer's account may be identified and controlled using the transaction tuple, the consumer is not longer required to have any specific payment token in their possession to facilitate return of the item.

In addition, when the transaction tuple is offered to the merchant, the merchant can confirm that transaction as not having already been returned (either using locally-stored records, or by reference to its financial services provider). At step 306, when the tuple is an extended tuple that includes service provider information, the financial-service provider uses the service-provider information included in the extended transaction tuple to route to the proper SP. The SP then may use the tuple to uniquely identify the consumer. At step 308 the consumer is informed of the status of the refund by the service provider; at step 307 the merchant is informed by their financial-services provider. Both the service provider and financial-services provider (and the merchant) can update their records to indicate the purchase has already been refunded to avoid replay attacks.

Accordingly, a commercial process has been shown and described that re-directs traditional commercial flow to provide a purchasing environment with improved consumer identity and resource protection, and increased payment option flexibility. Upon the completion of purchase, the consumer and the merchant each receive confirmation of a uniquely identified transaction. An intermediate service provider, monitoring transactions, also maintains a record of each consumer transaction. The distribution of transaction information in this manner facilitates transaction tracking, which greatly assists in return processing.

The commercial process is implemented through the exchange of commands between devices using a combination of hardware and software that execute protocols that enable the exchange of information between the devices. Thus each of the entities (the consumer, the Service Provider, the payment service and the merchant) includes computer processing capability. For example, the consumer may use a handheld PDA such as a Blackberry, or may use a cellular phone including hardware and software supporting GSM capability. A service provider is generally comprised of a collection of network devices, including routers, switches, and the like, each capable of executing various layers of different network protocols, and capable of supporting services such as that described in the present invention. The service provider may be separate and distinct from a network provider. The payment service, generally a financial institution, would also include computer processing capability, including existing POS communication ability as well and capability for supporting protocols to enable communication with the service provider. Merchants implementing the present invention may include traditional POS equipment which is augmented to support Bluetooth® protocols.

Having described exemplary embodiments of the invention, it will be appreciated that differently delineated functional equivalents may be readily substituted herein without affecting the scope of the invention. In addition, many of the above figures are flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block dr blocks.

Those skilled in the art should readily appreciate that programs defining the functions of the present invention can be delivered to a computer in many forms, including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using base band signaling or broadband signaling techniques, including carrier wave signaling techniques, such as over computer or telephone networks via a modem. The above description and figures have included various process steps and components that are illustrative of operations that are performed by the present invention. However, although certain components and steps have been described, it is understood that the descriptions acre representative only, other functional delineations or additional steps and components can be added by one of skill in the art, and thus the present invention should not be limited to the specific embodiments disclosed. In addition it is understood that the various representational elements may be implemented in hardware, software running on a computer, or a combination thereof.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

The invention claimed is:

1. A payment confirmation service provider system for facilitating transactions between merchants and consumers, the payment confirmation service provider system comprising:
   at least one receiver configured to receive communications from consumer devices;
   at least one transmitter configured to transmit communications to merchant systems; and
   a computer system comprising at least one processor coupled to the at least one receiver and the at least one transmitter and configured to:
      associate respective consumers with respective consumer devices;
      receive transaction information from a particular consumer device, the transaction information identifying at least one particular transaction between a particular consumer and a particular merchant, and comprising an authorization by the particular consumer to pay the particular merchant for the particular transaction; and
      transmit to a particular merchant system associated with the particular merchant information confirming that the particular consumer has authorized payment for the at least one particular transaction.

2. The payment confirmation service provider system of claim 1, wherein the at least one receiver is part of a communication interface to a communication network interconnecting the consumer devices to the payment confirmation service provider system.

3. The payment confirmation service provider system of claim 2, wherein the communication interface is configured for at least one of Short Message Service and Multimedia Message Service.

4. The payment confirmation service provider system of claim 1, wherein the at least one processor is configured to associate the respective consumers with the respective consumer devices by authenticating the respective consumers.

5. The payment confirmation service provider system of claim 4, wherein the at least one processor is further configured to authenticate the consumers using at least one of a challenge and a personal identification number.

6. The payment confirmation service provider system of claim 4, wherein the at least one processor is further configured to determine an appropriate level of authentication for a transaction based on transaction information.

7. The payment confirmation service provider system of claim 6, wherein the at least one processor is further configured to determine an appropriate level of authentication for the transaction based on at least one of the value of the transaction, a location of the transaction and a frequency of transactions.

8. The payment confirmation service provider system of claim 6, wherein the at least one processor is further configured to determine an appropriate level of authentication for the transaction based on distances between recent transactions.

9. The payment confirmation service provider system of claim 1, wherein the at least one processor is further configured to receive the transaction information comprising a respective transaction identifier for each transaction.

10. The payment confirmation service provider system of claim 9, wherein the at least one processor is further configured to receive the transaction information comprising a transacted item identifier for each transaction.

11. The payment confirmation service provider system of claim 9, wherein the at least one processor is further configured to receive the transaction information comprising a merchant identifier and a value of the transaction for each transaction.

12. The payment confirmation service provider system of claim 11, wherein the at least one processor is further configured to receive the transaction information comprising at least one payment option.

13. The payment confirmation service provider system of claim 12, wherein the at least one processor is further configured to receive the transaction information indicating a respective payment service for each payment option.

14. The payment confirmation service provider system of claim 13, wherein the at least one processor is further configured to receive the transaction information comprising a respective merchant identifier for each payment service.

15. The payment confirmation service provider system of claim 9, wherein the at least one processor is further configured to receive the transaction information comprising a time stamp for each transaction.

16. The payment confirmation service provider system of claim 9, wherein the at least one processor is further configured to receive the transaction information comprising at least one of an implicit authenticator and an explicit authenticator for each transaction.

17. The payment confirmation service provider system of claim 1, wherein the at least one processor is further configured to transmit to the particular merchant system associated with the particular merchant information indicating that the particular consumer has authorized payment comprising a transaction identifier.

18. The payment confirmation service provider system of claim 17, wherein the information indicating that the particular consumer has authorized payment comprises a time stamp.

19. The payment confirmation service provider system of claim 1, wherein the at least one processor is further configured to send payment confirmation information to the particular consumer device.

20. The payment confirmation service provider system of claim 1, wherein the at least one processor is further configured to store transaction information associated with particular consumers and to provide access to respective stored transaction information to respective consumers.

21. The payment confirmation service provider system of claim 20, wherein the at least one processor is further configured to analyze the respective stored transaction information.

22. The payment confirmation service provider system of claim 1, wherein the at least one processor is further configured to transmit the transaction information to at least one payment service provider.

23. The payment confirmation service provider system of claim 22, wherein the at least one processor is further configured to transmit the transaction information comprising a transaction identifier, a merchant identifier, a consumer identifier, and a transaction value.

24. The payment confirmation service provider system of claim 22, wherein the at least one processor is further configured to:
- receive a response from the payment service provider indicating that a higher level of consumer authentication is required for a particular transaction associated with a particular consumer; and
- execute a higher level of authentication with the particular consumer for the particular transaction.

* * * * *